(12) United States Patent
Alfano et al.

(10) Patent No.: US 7,312,713 B2
(45) Date of Patent: Dec. 25, 2007

(54) METHODS AND SYSTEMS FOR DETECTION OF ICE FORMATION ON SURFACES

(75) Inventors: Robert R. Alfano, Bronx, NY (US); Wubao Wang, Flushing, NY (US); Henry Sztul, New York, NY (US); Yury Budansky, Oakland, NJ (US)

(73) Assignee: Research Foundation of the City University of New York, New York, NY (US)

( * ) Notice: Subject to any disclaimer, the term of this patent is extended or adjusted under 35 U.S.C. 154(b) by 17 days.

(21) Appl. No.: 11/303,190

(22) Filed: Dec. 15, 2005

(65) Prior Publication Data

US 2007/0216536 A1    Sep. 20, 2007

Related U.S. Application Data

(60) Provisional application No. 60/636,523, filed on Dec. 17, 2004.

(51) Int. Cl.
    *G08B 19/02* (2006.01)
(52) U.S. Cl. ............... 340/583; 340/580; 340/581; 340/582; 250/341; 250/339.07
(58) Field of Classification Search ......... 340/583, 340/580, 581, 582; 250/341, 339.07
    See application file for complete search history.

(56) References Cited

U.S. PATENT DOCUMENTS

| 4,782,331 | A | * | 11/1988 | Martens ................ 340/583 |
| 4,797,660 | A | * | 1/1989 | Rein, Jr. ............... 340/583 |
| 5,296,853 | A | * | 3/1994 | Federow et al. ........ 340/962 |
| 5,929,443 | A | | 7/1999 | Alfano et al. |
| 6,425,286 | B1 | * | 7/2002 | Anderson et al. ....... 73/170.26 |
| 6,762,409 | B2 | * | 7/2004 | Fritsch et al. ......... 250/339.07 |

* cited by examiner

*Primary Examiner*—Tai Nguyen
(74) *Attorney, Agent, or Firm*—Darby & Darby P.C.; Bruce E. Black

(57) ABSTRACT

A system for detecting ice formation on metal, painted metal and other material surfaces can include a transparent window having an exterior surface upon which ice can form; a light source and optics configured and arranged to illuminate the exterior surface of the window from behind the exterior surface; and a detector and optics configured and arranged to receive light backscattered by the exterior surface and any ice disposed on the exterior surface and determine the thickness of the ice layer. For example, the system can be used with aircraft by placing one or more windows in the wings of the aircraft. The system is used for a novel optical method for real-time on-board detection and warning of ice formation on surfaces of airplanes, unmanned aerial vehicles (UAVs), and other vehicles and stationary structures to improve their safety and operation.

27 Claims, 6 Drawing Sheets

METHODS AND SYSTEMS FOR DETECTION OF ICE FORMATION ON SURFACES

RELATED APPLICATIONS

This patent application claims the benefit of U.S. Provisional Patent Application Ser. No. 60/636,523, filed Dec. 17, 2004, incorporated herein by reference.

STATEMENT REGARDING FEDERALLY SPONSORED RESEARCH OR DEVELOPMENT

This invention was made with government support under Grant No. NCC-1-03009 awarded by NASA. The government may have certain rights in this invention.

BACKGROUND

Detection and warning of ice formation on surfaces is significant for improving the safety and operation of airplanes, unmanned aerial vehicles (UAVs), space vehicles, other motor vehicles (e.g., cars and trains), and structures (e.g., bridges and buildings) in harsh weather conditions. For example, UAVs operate in regions where icing conditions can occur suddenly and cause the aircraft to fail. Conventional techniques for mitigating wing-icing conditions are often not feasible for UAVs due to power and weight constraints. Having the ability to detect an icing condition and navigate away from the area can be important for preserving the UAV.

There are several methods currently used or proposed for the detection of ice formation on airplanes and UAVs. The first method is based on a mass-spring system. The principle of this method is that the resonant frequency of a solid body will alter with a change in mass and stiffness. A piezoelectric material at its natural frequency excites the sensor diaphragm and, as ice forms on the sensor's surface, a change in stiffness occurs, causing the natural frequency to increase. The increase of the natural frequency can be used to indicate ice formation on the sensor surface, and provides a warning for ice formation on the surfaces of airplanes and UAVs. One difficulty with this method is that ice has a tendency to form around and over the mass-spring sensor rather than on the sensor itself, so that the warning signal for the ice formation provided by the sensor occurs later than the time that ice has formed on the target surfaces surrounding the sensor. This delay could result in a serious safety and operation problem for navigating UAVs and airplanes.

Another method is a passive near-infrared reflection device that crews use on the ground to detect ice formation on airplane surfaces from a distance. The method is used before the airplane takes off to determine deicing needs. The method uses a few narrow band pass devices in the 1-μm to 1.5-μm range to detect the presence of ice by measuring the amount of light reflected from the airplane. The system compares the relative intensity of light before it reaches the target and as it returns. The detection of ice formation is based on the difference in reflection intensity from the airplane surface, with and without ice. An incandescent light enables nighttime detection. Crews watch a monitor that shows gray-scale images of the aircraft, with icy areas showing up in red. The system can detect ice layers of 0.5 mm or thicker from as far as 65 feet away. One difficulty with this method is that it is only an on-ground technique and cannot currently be used for navigating airplanes and UAVs.

Another method, described in U.S. Pat. No. 5,929,443, incorporated herein by reference, uses difference diffusive reflectometry and an optical polarization imaging unit to illuminate an airplane and scan a light beam on the airplane wings. Polarization images are then recorded and used for ice detection outside the plane. This technique utilizes the difference in the depolarizaiion of polarized light scattered or diffusely reflected by metal and ice surfaces. One limitation of this technique is that the unit is used to either image an entire airplane or to scan the light beam point-by-point on wings of an airplane from outside the airplane. This is not an on-board application, and the unit is not placed inside the airplane. Harsh weather conditions (e.g., snow, heavy rain, fog, or hail) may also cause interference because the airplanes and the optical detection unit are separated.

BRIEF SUMMARY

One embodiment is a system for detecting ice formation. The system includes a window having an exterior surface upon which ice can form; a light source configured and arranged to illuminate the exterior surface of the window from behind the exterior surface; and a detector configured and arranged to receive light backscattered by the exterior surface and any ice disposed on the exterior surface.

Another embodiment is an article having a component with an exterior surface and an interior region. The article also includes one or more ice detection units for detecting ice formation on the exterior surface of the component. Each ice detecting unit includes a window having an exterior surface upon which ice can form, where the window is disposed in the exterior surface of the component; a light source configured and arranged to illuminate the exterior surface of the window from the interior of the component; and a detector configured and arranged to receive light backscattered by the exterior surface of the window and any ice disposed on the exterior surface of the window. For example, the article can be an airplane and the component can be the wing of the airplane with the ice detection unit being used to detect the formation of ice on the wing. Other examples of articles which can be benefit from the ice detection units include other aircraft, other vehicles, and structures, such as bridges and buildings.

Yet another embodiment is a method for detecting ice formation on an exterior surface of an object. A window is provided on the exterior surface of the object. The window has an exterior surface upon which ice can form. The exterior surface of the window is illuminated from behind with light. The light backscattered from the exterior surface of the window is observed to detect ice formation.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Methods and systems are described herein for on-board real-time detection, thickness determination, and/or warning of ice formation on surfaces of airplanes, UAVs, and other vehicles and material structures. The method and system employ, for example, an illuminating light beam output from one or more lasers, LEDs and/or other light sources. The system and method may also employ optical components (e.g., band pass filters, polarizers, optical fibers and lenses), lock-in amplifiers and other modulators, optical detectors (e.g., photo-multiplier tubes (PMT), photodiodes, and/or CCD cameras), and data transfer systems (e.g., transmitter-receivers and/or cable systems).

For the real-time detection and warning of ice formation on airplanes, UAVs, other vehicles, and structures, a number of optical ice detection units can be mounted inside the airplane, UAV, vehicle, or structure to monitor ice formation on different surface areas. The application of the method and system to an airplane or UAV will be used below as an illustration of structure and operation for the methods and systems. It will be recognized, however, that the methods and systems described herein can be used and adapted, if necessary, for a variety of vehicles and structures including, but not limited to, motor vehicles (e.g., cars, trucks, buses, etc.), trains, space vehicles, watercraft (e.g., boats, ships, etc.), buildings, bridges, containers, power lines, and the like.

Several embodiments of the method and system are shown in FIGS. 6-10. In at least one embodiment, a transparent window (e.g., a piece of transparent material like glass, quartz, or an optical fiber glass head) of each ice detection unit can be mounted, for example, in the surface of the leading edge of a wing or other component, where ice may form and, preferably, where ice is most likely to form. A beam output from a light source (e.g., a laser, LED or other light source) illuminates the window, and the light backscattered from the window, with and without ice is detected using, for example, a photo-multiplier tube, a photo-diode, or a CCD/CMOS cameras. By measuring the change in intensity of light backscattered from the windows, with and without ice, the formation of ice on the surfaces of the windows can be sensitively monitored. This can provide a warning of ice formation on the structure, e.g., wing areas, surrounding the windows. A warning signal can be sent, for example, to the cockpit/pilot (or to another person or device) for audio/visual display through, for example, a transmitter-receiver and/or cable system. The person or device receiving the warning signal may, for example, start a de-icing system or navigating away from the ice-forming area. To determine the thickness of the ice layer the presence of an interference effect can be observed. The time at which each maxima occurs is determined, whereby the thickness at each interference maxima is known.

Figure 1:
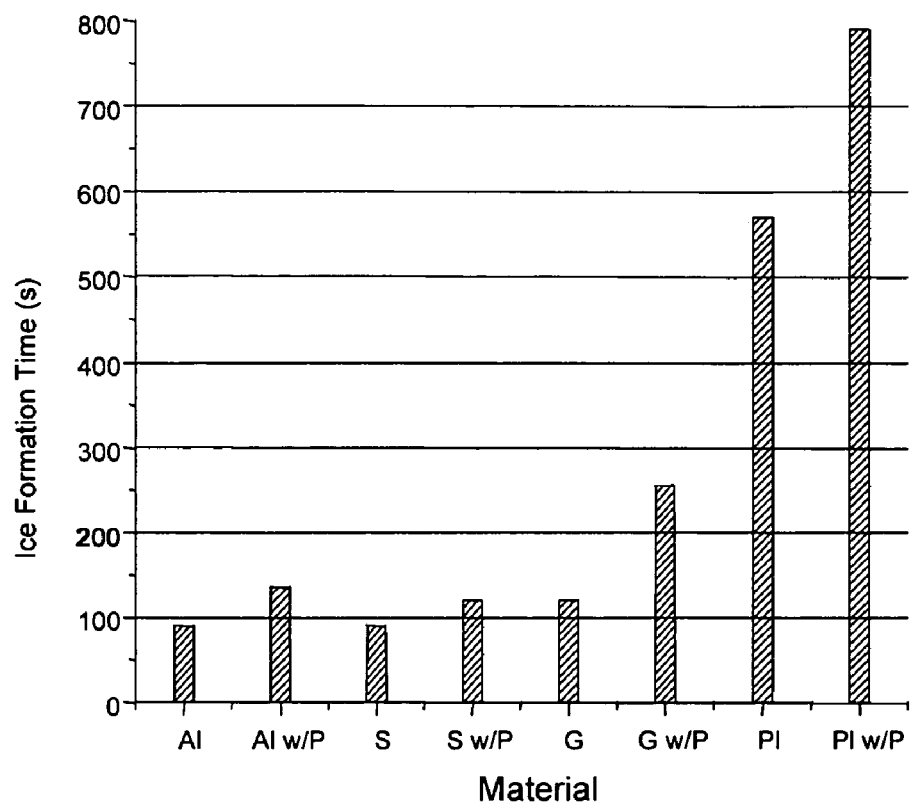
FIG. 1 is a graph of ice formation time for a number of different surfaces (Al=aluminum, Al w/P=painted aluminum, S=steel, S w/P=painted steel, G=glass, G w/P=painted glass, Pl=plastic, Pl w/P=painted plastic)

As shown in FIG. 1, ice formation times on painted aluminum surfaces (e.g., airplanes and UAVs) and steel surfaces (e.g., bridges and trains) are almost the same as ice formation time on unpainted glass surfaces. This result indicates that one can detect ice formation on unpainted glass surfaces and use it as a warning signal for ice formation on painted aluminum and steel surfaces. Therefore, glass windows can be used to observe and measure ice formation instead of measuring ice formation on painted metal surfaces. For example, an optical ice detection unit can be mounted inside the wings of an airplane or UAV to avoid the influence of the harsh weather conditions (e.g., snow, heavy rain, fog, hail). It will be recognized that optical ice detection units can also be mounted within other compartments of the same vehicle or structure, or components of other vehicles and structures to detect ice on exterior surfaces.

In addition, this method avoids or reduces the effect of light scattering by paint. Since the paint on the airplane or UAV surface is a turbid media, which strongly scatters incident light like ice, detecting ice formation directly on the painted metal surfaces may produce misleading results. Instead, ice formation can be detected using a window of glass or another material which has an ice formation time similar to that for the metal surface.

There is a large difference in the intensity of light backscattered from metal (or glass) and ice surfaces. The detected intensity of light backscattered from an ice surface is much stronger than that from a metal (or glass) surface, which indicates that ice surfaces scatter light much more than metal (or glass) surfaces. By measuring the change in the intensity of light backscattered from metal (or glass) surfaces, with and without ice, using, for example, PMTs, photodiodes or CCD cameras, the formation of ice on the metal (or glass) surfaces can be sensitively monitored.

The systems and methods can be extensively applied to the detection of ice formation on surfaces of other vehicles and material structures besides the airplanes and UAVs. The advantages of at least some embodiments described herein are that the methods and systems can be on-board, real-time, sensitive, nondestructive and/or reliable detection in harsh weather and can be a small size, lightweight and/or low cost unit.

Returning to FIG. 1, ice formation times are presented for surfaces of aluminum, steel, glass, and plastic, with and without paint, where Al: Aluminum surface, Al w/P: aluminum surface with paint, S: steel surface, S w/P: steel surface with paint, G: glass surface, G w/P: glass surface with paint, Pl: plastic surface, and Pl w/P: plastic surface with paint. The results show that it takes about 135 sec. for ice to form on an aluminum surface with paint and about 120 sec. for ice to form on a glass surface without paint. Therefore, ice formation on glass surfaces (e.g., a glass window or an optical fiber face) can be used as a warning indicator of ice formation on painted aluminum surfaces such as airplanes and UAVs. It will be recognized that there may be some plastic or polymer materials, as well as other materials, that have ice formation times similar to metal. Such materials could be suitable for use as the window. For the detection of ice on airplanes, UAVs, space vehicles, other vehicles, and structures, the optical unit can be mounted from outside or inside their bodies. In order to reduce the size and weight of these vehicles, and/or improve the safety and stability of the ice detection unit, it may be preferable to assemble the unit inside the airplanes and UAVs (or other vehicles and structures) such as inside their wings as shown in FIG. 6-10.

Figure 2:
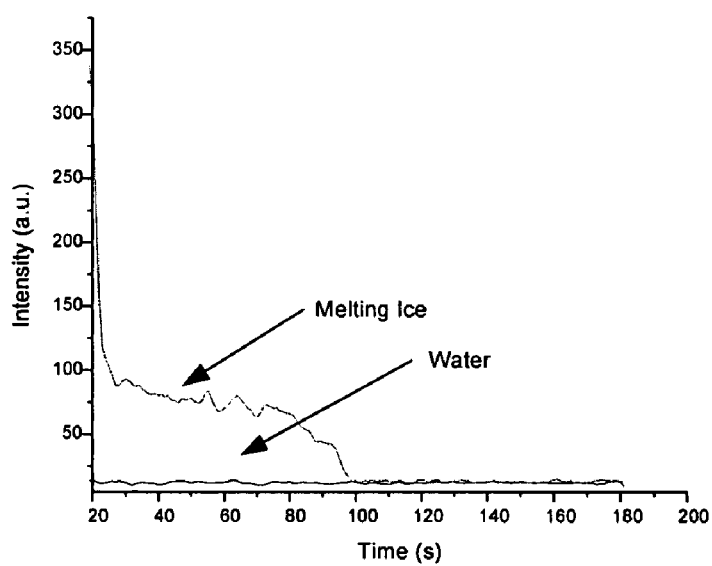
FIG. 2 is a graph of the intensity of light backscattered from a glass surface covered with water or melting ice as a function of time, respectively.

FIG. 2 is a graph of the measured intensity of light backscattered from a glass surface as a function of time (a) as ice is melting and (b) with water covering the glass. The experimental setup used for the measurements is similar as the setup shown in FIG. 6. A 633 nm laser beam was used to illuminate the glass surface, and a PMT was used to measure the intensity of light backscattered from the target surface. The thickness of the ice layer was about 100 µm. The intensity of light scattered from the glass surface with ice before melting is much stronger than that without ice. The intensity of light backscattered from the ice surface is up to 7 times stronger than that from the glass surface itself. The existence of ice is identified by the significant difference in the intensity of light backscattered from the surface.

Figure 3:
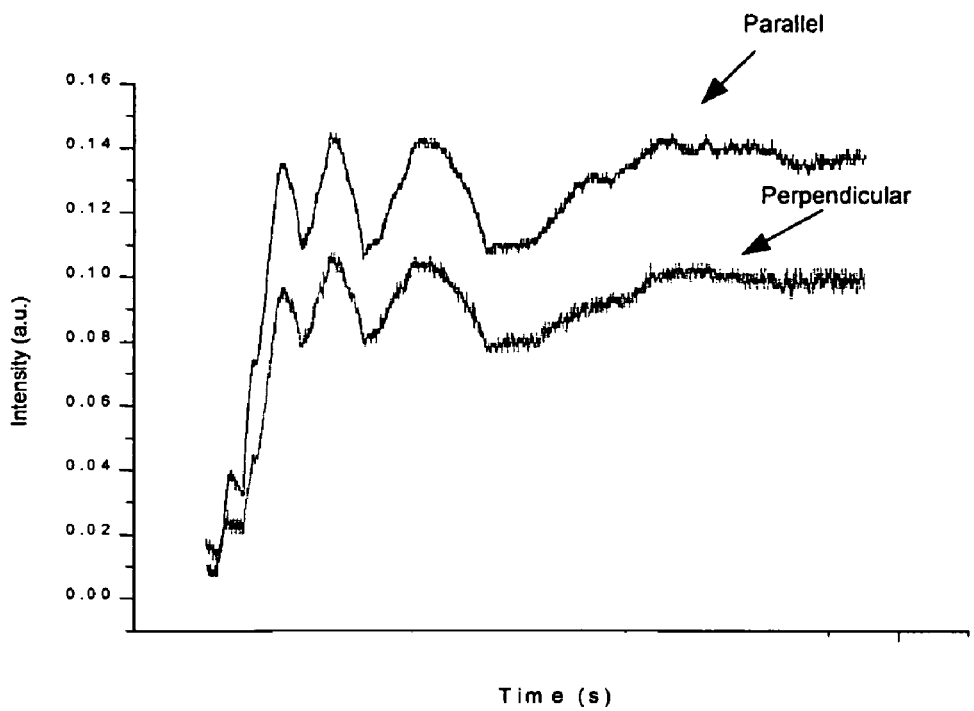
FIG. 3 is a graph of scattering intensity for parallel and perpendicular polarized light off a glass surface as ice is forming on the surface.

FIG. 3 is a graph of the measured intensities of parallel and perpendicular components of light backscattered from a glass surface as a function of time when ice is forming. In the experiment, a 633 nm laser beam was used to illuminate the glass surface and a photodiode was used to measure the intensity of light backscattered from the target surface. The results show that the intensity of light backscattered from the metal surface with ice after the ice formed is much stronger than without ice. The intensity of light backscattered from the ice surface is up to 8 times stronger than that from the metal surface. Ice formation is identified from the significant change in the intensity of light backscattered from the target surface. In both parallel and perpendicular components of the backscattered light, oscillations of the light intensity are observed.

The scattering properties of light propagating in ice layers and backscattered from ice surfaces can be used to monitor the status of the ice. The intensity of light backscattered from material surfaces, with and without ice formation, can be measured and distinguished using different optical detection systems such as PMT or photodiode-based light intensity detection system and CCD-based optical imaging system.

For example, the output beam from a light source can be chopped and coupled into an optical fiber after passing through one or more band pass filters and a polarizer ($P_1$). The band pass filters are used to select the incident wavelengths and the polarizer $P_1$ is used to make the incident light linearly polarized. The coherent optical fibers are used to maintain the polarization of incident light. The light backscattered from a target surface is collected by an optical fiber bundle. The scattered light output from the fiber bundle will first pass through another polarizer ($P_2$) and then one or more band pass filters. The polarization direction of $P_2$ is kept perpendicular to that of $P_1$, and the band pass filters in front of the detector are used to ensure that only scattered light (not fluorescence light) is detected. Since ice surfaces depolarize the light much more than metal surfaces, the detected intensity of the perpendicular component of light backscattered from an ice surface should be much stronger than that from a metal surface. By measuring the change in intensity of the perpendicular component of light backscattered from metal surfaces, with and without ice formation, the formation of the ice on metal surfaces can be sensitively monitored. This method and system can be also used to detect ice formation on other surfaces such as glass and plastic surfaces, which also depolarize light very little in the absence of ice.

Figure 4:
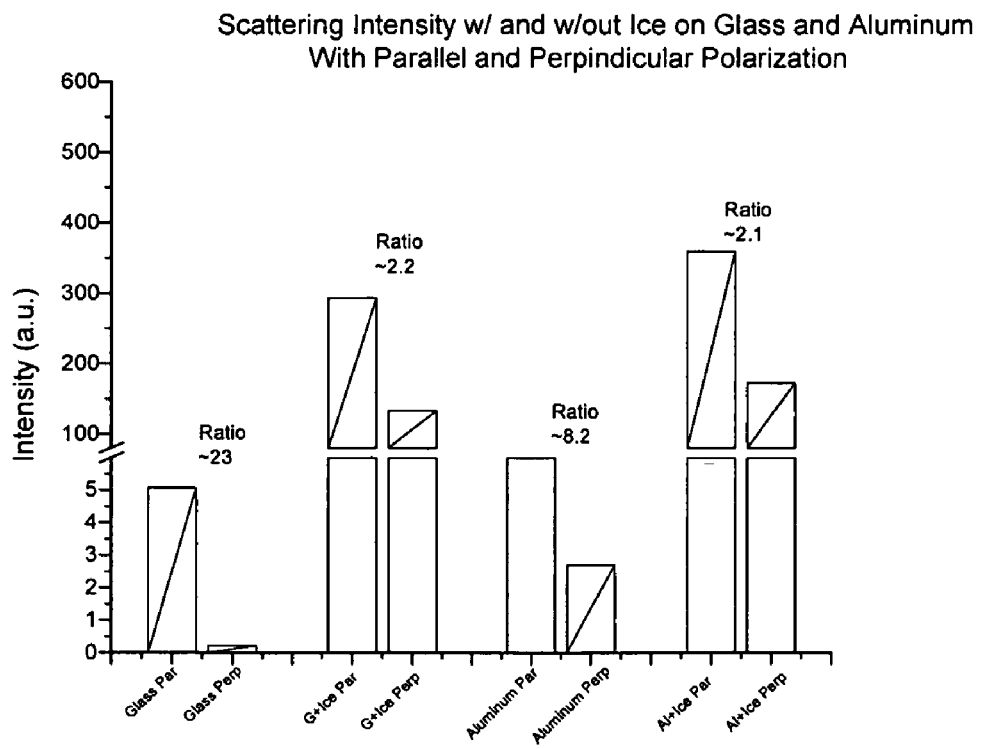
FIG. 4 is a graph of scattering intensity for parallel and perpendicular polarized light off glass and aluminum surfaces with and without ice on the surfaces, and the ratio of $I_{par}/I_{perp}$ for each case.

FIG. 4 is a graph of the measured intensities of two polarization components of light backscattered from glass and metal (aluminum) surfaces, with and without ice, and the ratio of $I_{par}/I_{perp}$ for each case. In the experiments, a 633 nm laser beam was used to illuminate the target surfaces, and a photodiode was used for detection of the intensity of light backscattered from the target surfaces. The parallel and perpendicular components were measured when the detection polarization was parallel or perpendicular to that of illumination light, respectively. The ratio of the parallel over the perpendicular intensities ($R=I_{paral}/I_{perp}$) for each surface was calculated to be 23, 8.2, and 2.3 for glass, metal, and ice surfaces, respectively. The ratio of the two polarization components of the scattered light for the ice surface is significantly smaller that for the metal/glass surfaces. This significant difference in the degree of depolarization for light scattered from ice and metal/glass surfaces permits the sensitive monitoring of the formation of ice on metal and glass surfaces. The oscillation patterns in the perpendicular component are thought to be caused by interference due to the birefringence of ice crystals.

The results show that the parallel component of the scattered light (i.e., the polarization direction is parallel to that of the incident light) is much stronger than that of the perpendicular component (i.e., the polarization direction is perpendicular to that of the incident light) for glass and metal surfaces without ice formation. This indicates that the light scattered from a smooth aluminum surface is still essentially polarized and maintains the same polarization direction as the incident light. In contrast, the intensities of the parallel component of the scattered light and of the perpendicular component for the ice surfaces are substantially closer for ice surfaces. This indicates that ice surfaces strongly depolarize the backscattered light under polarized light illumination while metal surfaces depolarize the light very little.

The difference in the degree of depolarization between metal/glass surfaces and ice surfaces can be used to further improve the detection of ice formation on metal/glass surfaces. The effect of background illumination on the glass windows can be removed or reduced using a difference polarization intensity/imaging technique. The background illumination from sunlight or field lighting is usually non-polarized; therefore, its parallel and perpendicular components are almost evenly distributed. The contribution of the background light to the intensities or images observed by a detection unit is almost equal for the parallel and perpendicular components. For example, taking both parallel and perpendicular intensities/images and using difference polarization intensity/imaging instead of individual parallel or perpendicular intensities/images allows for the rejection of the intensity/image information arising from non-polarized background illumination from sunlight or field lighting. The background illumination sources cancel out by subtraction of the parallel and perpendicular intensities/images.

Since ice surfaces significantly depolarize the light, and glass/metal surfaces depolarize the light very little, the detected intensity of the perpendicular component of light backscattered from ice surfaces should be much stronger than that from glass/metal surfaces. Therefore, the perpendicular component of the light backscattered from the target surface is more sensitive to ice formation. By monitoring the intensity of the perpendicular component of light backscattered from the target surface with PMT, photodetectors or CCD camera, the existence of ice on the target surface can be identified.

Since ice surfaces depolarize the light more than metal surfaces, an intensity/image formed by light backscattered from an ice surface should be substantially brighter than that from a metal surface. By monitoring intensities/images formed by light backscattered from target surfaces, with and without ice, one can distinguish icy conditions on the target surfaces.

Figure 5A:
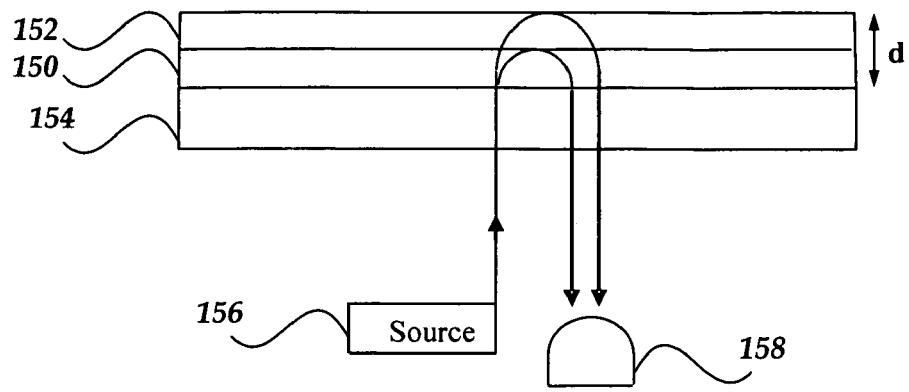
FIG. 5A is a schematic illustration of light scattering off two layers of ice formed on a transparent window.
Figure 5B:
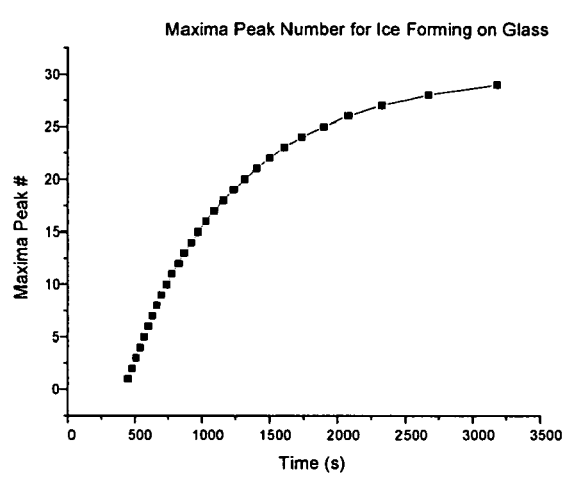
FIG. 5B is a graph of the number of maxima peaks over time for ice forming on a glass surface.
Figure 5C:
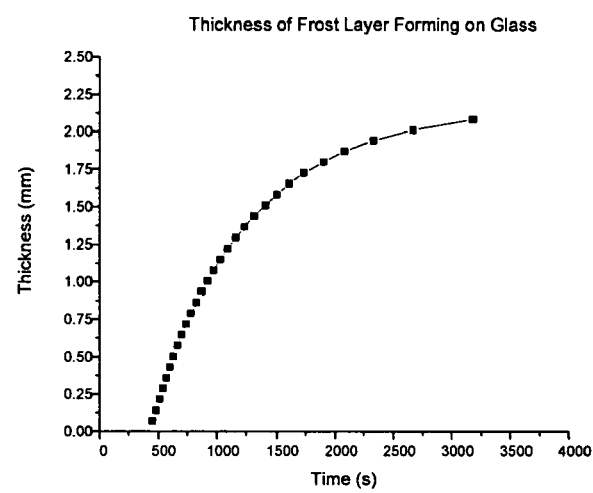
FIG. 5C is a graph of the thickness of an ice (frost) layer over time as ice is forming on a glass surface based on the information in FIG. 5B.

FIGS. 5A-5C illustrate a method of making, and graphs of, thickness measurements taken from the interference effect observed as the ice layer forms. In both the parallel and perpendicular components of the backscattered light, an oscillation in the backscattered intensity within the increasing intensity trend is seen in FIG. 3. As the ice crystal layers form, the light from a source 156 is backscattered by the top layer 152 which interferes constructively or destructively, with the light backscattered from the prior layer 150, as shown in FIG. 5A. This effect can be observed by a detector 158. Constructive interference corresponds to the constructive interference equation for a layer, $2\pi \cdot n \cdot d = m \cdot \lambda$, where n is the index of refraction of ice taking into account the birefringence of ice, d is the thickness of the ice layer, $\lambda$ is the wavelength of the illumination light, and m is an integer (0, 1, 2 . . . ). Each maximum is observed (e.g., FIG. 3) and the time corresponding to each maximum is plotted in FIG. 5B. The maxima can then be converted to thickness as illustrated in FIG. 5C. The thickness of the ice layer is decreasing due to the distance the top layer is from the cooling source. Thicknesses on the order of 75 μm are observed. It is thought that the interference effect arises from the orientation of the crystals and the bireflingent property of ice.

A glass surface was imaged with and without a thin layer of ice (e.g., frost.) The piece of glass was attached to a thermal electronic (TE) cooling system to form the ice. The illumination beam had a circular shape. Band pass filters and polarizers were used to vary scattering imaging wavelengths and polarization configurations. Images of the glass piece formed by the light backscattered from the surface, with and without frost, were recorded using a Si-based CCD camera. The intensity image of the surface with frost was much stronger than that without frost, and the frost was clearly distinguished in the backscattering CCD images.

Figure 6:
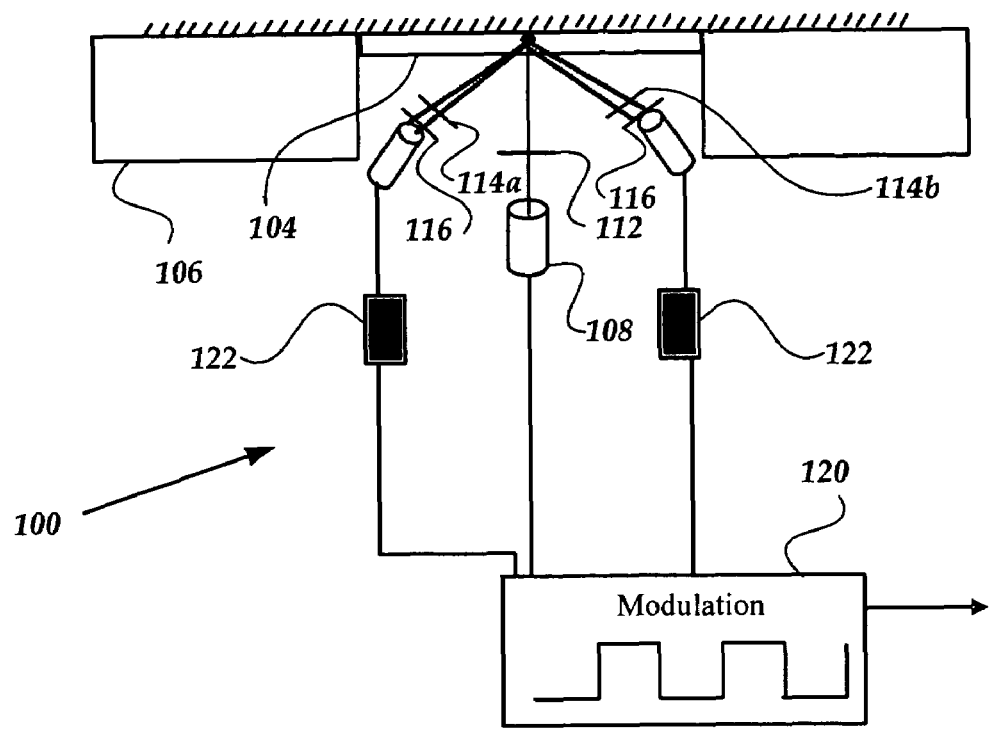
FIG. 6 is a schematic illustration of one embodiment of an optical unit for detection of ice formation, according to the invention.

FIG. 6 is a general schematic diagram of an optical unit 100 for on-board real-time detection and warning of ice formation on airplanes, UAVs, and other vehicles and structures using an optical fiber bundle or a non-fiber optical unit. A glass window 104 is mounted in a target surface, for example, in the surface of the leading edge of a wing 106 of an airplane or a UAV, where ice is likely to form. A modulated (using modulator 120) or unmodulated light source 108 illuminates the window 104 after passing through a polarizer 112 and, optionally, additional optical components such as narrowband filters and/or lenses. The backscattered light after passing through a polarizer 114a, 114b and, optionally, through one or more additional optical components such as narrowband filters 116 and/or lenses. The light that is backscattered from the glass window is detected using a detector 122, such as a photo-multiplier tube, a photo-diode, or a CCD. In one embodiment, the polarizers 114a, 114b are oriented to pass orthogonal polarizations so that both parallel and perpendicular polarized (relative to polarizer 112) light is detected. The output of the detectors can be provided to amplifiers 122. An array of such optical units can be used on various surfaces on the plane, UAV, or other vehicle or structure.

Figure 7:
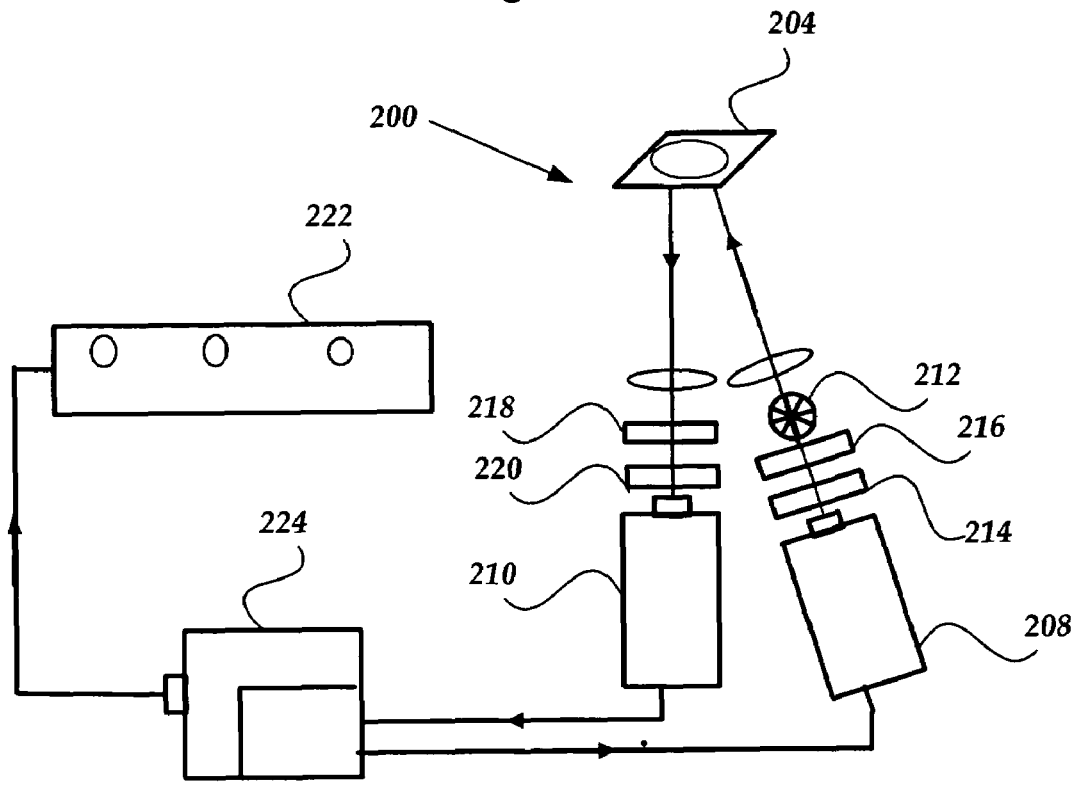
FIG. 7 is a schematic illustration of another embodiment of an optical unit for detection of ice formation, according to the invention.

FIG. 7 is a schematic diagram of an optical unit 200 for on-board real-time detection and warning of ice formation on airplanes, UAVs, and other vehicles and structures using lock-in amplifier(s) and non-fiber optics. A glass window 204 is mounted in a target surface, for example, in the surface of the leading edge of a wing of an airplane or a UAV, where ice is likely to form. A beam output from a light source 208 (for example, a laser, LED or other light source) is chopped by a light chopper 212 and used to illuminate the glass window after passing through one or more band pass filters 214 and a polarizer ($P_1$) 216. The band pass filter(s) are used to select the incident wavelengths and the polarizer $P_1$ is used to make the incident light linearly polarized. The light backscattered from the glass window is detected using a detector 210, such as a photo-multiplier tube or a photo-diode or a CCD imaging system (e.g., a CCD camera) with or without a lock-in amplifier in 224, after passing through another polarizer ($P_2$) 218 and one or more band pass filters 220. The polarization direction of $P_2$ can be varied relative to that of $P_1$, if desired, and the band pass filter(s) in front of the detector is used to ensure that primarily scattered light (not fluorescence light) is detected. Since ice surfaces greatly scatter the light and glass surfaces scatter the light very little, the detected intensity of light backscattered from an ice surface should be much stronger than that from a glass surface. By measuring the change in intensity of the light (or an image formed by the light) backscattered from the glass window, ice formation on the surface of the glass window can be sensitively monitored.

This monitoring can be used by a processor coupled to the detector to provide a warning of ice formation on the wing areas surrounding the glass window. A warning signal can sent to a central control system 222 and/or to a person or other device. For example, the warning can be sent to a cockpit for audio/visual display, through a transmitter-receiver or cable system 224. The warning can indicate to a person or device that action should be taken such as, for example, starting the de-icing system or navigating away from the area.

Figure 8:
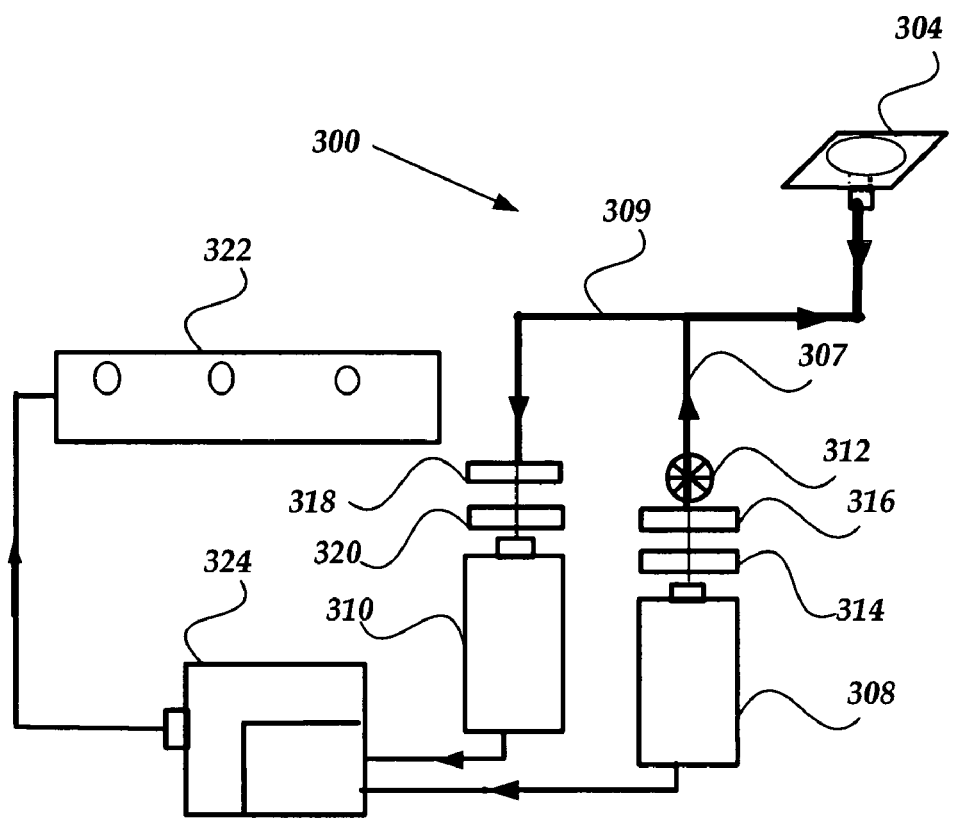
FIG. 8 is a schematic illustration of a third embodiment of an optical unit for detection of ice formation, according to the invention.

FIG. 8 is a schematic diagram of an optical unit 300 used for on-board real-time detection and warning of ice formation on airplanes, UAVs, and other vehicles and structures using lock-in amplifier(s) and optical fiber techniques. A glass optical fiber head 305 is mounted in or near a target surface, for example, in the surface of the leading edge of a wing where the ice is most likely formed. A beam output from a light source 308 (for example, a laser, LED or other light source) is chopped by a light chopper 312 and coupled into an optical fiber to illuminate the fiber glass head after passing through one or more band pass filters 314 and a polarizer ($P_1$) 316. The band pass filter(s) are used to select the incident wavelengths and the polarizer $P_1$ is used to make the incident light linearly polarized. Coherent optical fibers 307 are used to keep the polarization of the incident light. An optical fiber bundle 309 collects the light backscattered from the target surface. The scattered light output from the fiber bundle passes through another polarizer ($P_2$) 318 and one or more band pass filters 320. The polarization direction of $P_2$ is varied relative to that of $P_1$, if desired, and the band pass filters in front of the detector are used to ensure that primarily scattered light (not fluorescence light) is detected. Since ice surfaces greatly scatter the light and glass surfaces scatter the light very little, the detected intensity of light backscattered from the ice surface should be much stronger than that from a glass surface (without ice.) The light backscattered from the optical fiber glass head with and without ice can be detected using a detector 310, such as a photo-multiplier tube or a photo-diode or a CCD imaging system (e.g., a CCD camera) with or without a lock-in amplifier in 324. By measuring the change of intensity of the light (or an image formed by the light) backscattered from the glass optical fiber head the ice formation on the surface of the glass optical fiber head can be sensitively monitored.

This monitoring can be used by a processor coupled to the detector to provide a warning of ice formation on the wing areas surrounding the glass window. A warning signal can sent to a central control system 322 and/or to a person or other device. For example, the warning can be sent to a cockpit for audio/visual display, through a transmitter-receiver or cable system 324. The warning can indicate to a person or device that action should be taken such as, for example, starting the de-icing system or navigating away from the area.

Figure 9:
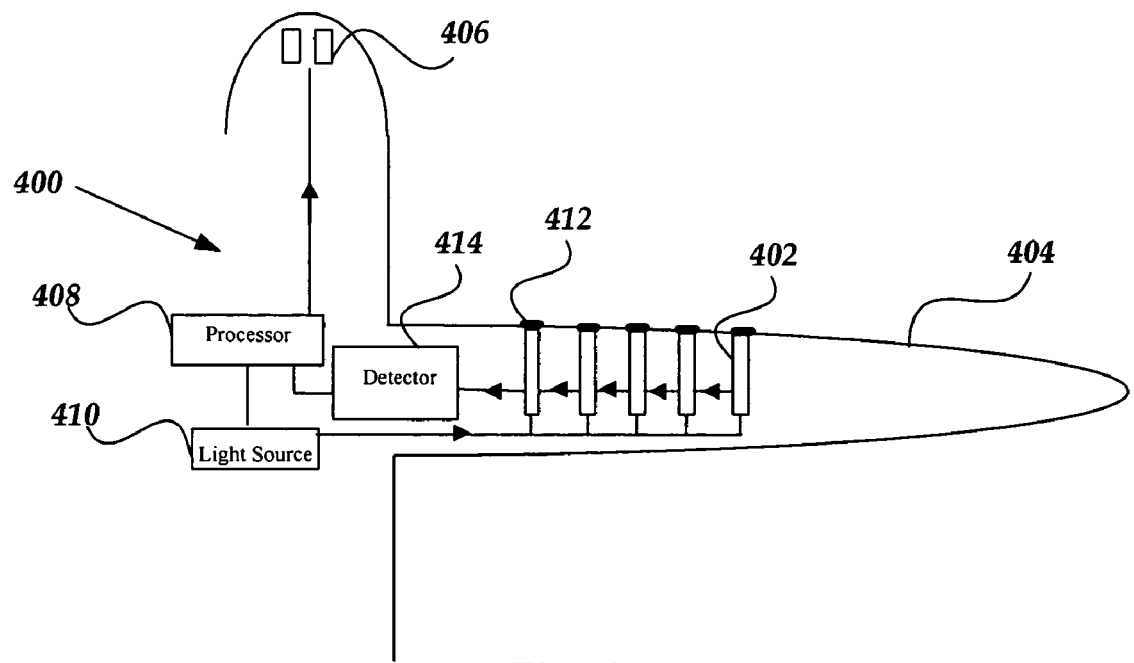
FIG. 9 is a schematic illustration of one embodiment of an array of optical units for detection of ice formation disposed in the wing of an airplane, according to the invention.
Figure 10:
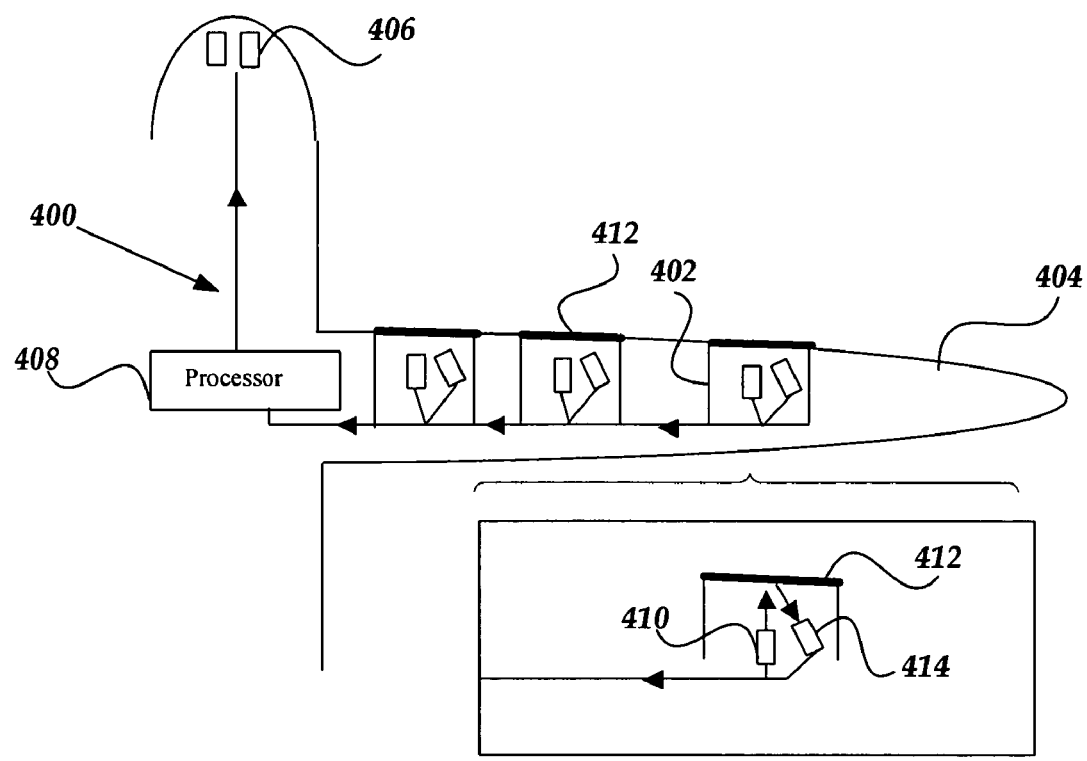
FIG. 10 is a schematic illustration of another embodiment of an array of optical units for detection of ice formation disposed in the wing of an airplane, according to the invention.

FIG. 9 and FIG. 10 are schematic diagrams of embodiments of an optical system 400 used for on-board real-time detection and warning of ice formation on airplanes, UAVs, and other vehicles and structures, in which a number of optical ice detection units 402 are mounted on target surfaces, for example, inside the wings 404 of an airplane or an UAV. FIG. 9 illustrates an array of optical fiber bundles and FIG. 10 illustrates an array of non-fiber optical detectors or CCD imaging systems. Each individual unit is as described above and includes a light source 410, a window 412, and a detector 414. By measuring the change of intensity of the light backscattered from the windows, with and without ice, the formation of ice on the surfaces of glass windows can be sensitively monitored. This monitoring can be provided to a processor that can produce a warning of ice formation on the wing areas surrounding the glass windows. In one embodiment, the data obtained from different ice detection units can be displayed in different windows of a computer screen for the pilot or another individual. Information of ice layer thickness can be optionally displayed for the pilot, if desired and if determined as described above. The warning signal can be sent to the central control system 406, for example, to the cockpit/pilot for audio/visual display through, for example, a transmitter-receiver or cable system 408. The warning can indicate to a person or device that action should be taken such as, for example, starting the de-icing system or navigating away from the area.

In one embodiment, background intensities at different times during the day and night can be measured and calculated by averaging. The real-time intensity of light backscattered from the target surface can be monitored and compared with consideration of effect of the background intensity. In at least some instances, the results can be classified within one of two or more ranges by a computer program. A visual display (see, for example, FIGS. 7 and 8) can be generated from this information. For example, when the scattering light intensity is the same as, or near, the background level the visual display can provide a green light. With increased scattering light intensity (for example, several times higher than the background level) the visual display can signal with a yellow light. For much higher scattering intensity (typically, above a threshold) the visual display can signal with a red light.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A system for detecting ice formation on a surface, comprising:
   a window having an exterior surface upon which ice can form;
   a light source configured and arranged to illuminate the exterior surface of the window from behind the exterior surface;
   a polarizer disposed between the light source and the window and configured and arranged to polarize the light from the light source prior to illumination of the window; and
   a detector configured and arranged to receive, and detect at least one characteristic of, light backscattered by the exterior surface and any ice disposed on the exterior surface.

2. The system of claim 1, wherein the window comprises glass, quartz, or sapphire.

3. The system of claim 2, wherein the system is configured and arranged to detect ice formation on a painted or unpainted metal or plastic surface of an object by observing ice formation on the window when the window is disposed in the object.

4. The system of claim 1, wherein the light source is a laser or LED, with or without modulation.

5. The system of claim 1, wherein the detector is a photodiode, photomultiplier tube or CCD camera.

6. The system of claim 1, further comprising at least one component selected from the group consisting of band pass filters, polarizers, lenses, choppers, optical fibers, and lock-in amplifiers.

7. The system of claim 1, wherein the system comprises a processor configured and arranged to determine a thickness of ice formed on the window by observing the backscattered light.

8. The system of claim 1, further comprising a warning arrangement coupled to the detector to provide a warning signal in response to ice formation.

9. The system of claim 8, wherein the warning arrangement comprises a visual indicator.

10. The system of claim 1, wherein the window comprises a head of one or more optical fibers.

11. The system of claim 1, further comprising a polarizer disposed between the window and the detector to polarize light backscattered toward the detector by the exterior surface of the window and any ice disposed on the exterior surface of the window.

12. An article, comprising:
   a component having an exterior surface and an interior region; and
      a ice detection unit for detecting ice formation on the exterior surface of the component, the unit comprising
      a window having an exterior surface upon which ice can form, wherein the window is disposed in the exterior surface of the component, a light source configured and arranged to illuminate the exterior surface of the window from the interior of the component, a polarizer disposed between the light source and the window and configured and arranged to polarize the light from the light source prior to illumination of the window, and a detector configured and arranged to receive, and detect at least one characteristic of, light backscattered by the exterior surface of the window and any ice disposed on the exterior surface of the window.

13. The article of claim 12, wherein the exterior surface of the component comprises primarily a metal or painted metal surface.

14. The article of claim 13, wherein the ice detection unit is configured and arranged to detect ice formation on the metal or painted metal surface of the component by observing ice formation on the window.

15. The article of claim 12, wherein the article is a vehicle.

16. The article of claim 15, wherein the vehicle is an aircraft and the ice detection unit is disposed in the wing of the aircraft with the window is exposed on a surface of the wing.

17. The article of claim 12, wherein the vehicle is a car, truck, bus, train, or watercraft.

18. The article of claim 12, wherein the article is a stationary structure.

19. The article of claim 12, further comprising a polarizer disposed between the window and the detector to polarize light backscattered toward the detector by the exterior surface of the window and any ice disposed on the exterior surface of the window.

20. A method for detecting ice formation on an exterior surface of an object, the method comprising:

providing a window on the exterior surface of the object, the window having an exterior surface upon which ice can form;

illuminating the exterior surface of the window from behind with polarized light; and observing at least one characteristic of the light backscattered from the exterior surface of the window to detect ice formation.

21. The method of claim 20, further comprising generating a warning signal when ice formation is indicated by observing the backscattered light.

22. The method of claim 20, further comprising generating a visual signal based on the observation of the backscattered light.

23. The method of claim 22, wherein generating a visual signal comprises generating a first visual signal when ice formation is not indicated by the observation of the backscattered light and generating a second visual signal, different from the first visual signal, when ice formation is indicated by the observation of the backscattered light.

24. The method of claim 20, wherein observing the light comprises separately observing two orthogonal polarizations of the light backscattered from the exterior surface of the window to detect ice formation.

25. The method of claim 24, further comprising determining a thickness of any ice formed on the window from the observation of the two polarizations of the backscattered light.

26. The method of claim 24, further comprising determining the difference between intensities for the two polarizations of the backscattered light to detect ice formation.

27. The method of claim 20, wherein observing the light backscattered from the exterior surface of the window comprises polarizing the light backscattered from the exterior surface of the window prior to observation.

* * * * *